United States Patent
Lin

(10) Patent No.: US 9,749,612 B2
(45) Date of Patent: Aug. 29, 2017

(54) DISPLAY DEVICE AND DISPLAY METHOD FOR THREE DIMENSIONAL DISPLAYING

(71) Applicant: BOE TECHNOLOGY GROUP CO., LTD., Beijing (CN)

(72) Inventor: She Lin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 97 days.

(21) Appl. No.: 14/800,461

(22) Filed: Jul. 15, 2015

(65) Prior Publication Data

US 2016/0227204 A1  Aug. 4, 2016

(30) Foreign Application Priority Data

Feb. 4, 2015 (CN) .......................... 2015 1 0058988

(51) Int. Cl.
H04N 13/04 (2006.01)
H04N 13/02 (2006.01)

(52) U.S. Cl.
CPC ..... *H04N 13/0239* (2013.01); *H04N 13/0296* (2013.01); *H04N 13/0468* (2013.01); *H04N 2213/006* (2013.01)

(58) Field of Classification Search
CPC .......... H04N 13/0239; H04N 13/0296; H04N 13/0468; H04N 2213/006
See application file for complete search history.

(56) References Cited

U.S. PATENT DOCUMENTS

2014/0176676 A1* 6/2014 Lin ................... H04N 13/0472
                                                                348/46
2014/0192168 A1* 7/2014 Shimoyama ....... H04N 13/0447
                                                                348/50

FOREIGN PATENT DOCUMENTS

| CN | 101931823 A | 12/2010 |
| CN | 102520970 A | 6/2012 |
| CN | 103354616 A | 10/2013 |
| EP | 0874303 A1 | 10/1998 |

OTHER PUBLICATIONS

First Office Action regarding Chinese Application No. 201510058988.1, dated May 2, 2017. Translation provided by Dragon Intellectual Property Law Firm.

* cited by examiner

*Primary Examiner* — Christopher S Kelley
*Assistant Examiner* — Nasim Nirjhar
(74) *Attorney, Agent, or Firm* — Harness, Dickey & Pierce, P.L.C.

(57) ABSTRACT

In the present disclosure, it is provided a display device, which may include: a detection unit, configured to detect position information with respect to viewer's eyes; a processing unit, configured to obtain the position information with respect to the viewer's eyes from the detection unit, and obtain a screen display image corresponding to a visual angle of the eyes based on the position information with respect to the eyes and parameters for a stereo image to be displayed; and a display unit, configured to obtain the screen display image from the processing unit, and display the screen display image on the display unit.

16 Claims, 4 Drawing Sheets

DISPLAY DEVICE AND DISPLAY METHOD FOR THREE DIMENSIONAL DISPLAYING

CROSS REFERENCE OF RELATED APPLICATION

The present application claims the priority of Chinese patent application No. 201510058988.1 filed on Feb. 4, 2015, the disclosure of which is incorporated herein by reference.

TECHNICAL FIELD

The present application relates to a technical field of displaying, and more particular to a display device and a display method for three dimensional (3D) displaying.

BACKGROUND

When an image is displayed on a conventional display device, a viewer may observe the same displayed image from any position before a screen of the display device, i.e. the image that the viewer observes is independent of the visual angle of the viewer and kept unchanged, which may not present the viewer with a visual experience as if in a real world.

SUMMARY

In view of the above fact, it is an object of the present application to provide a display method and a display device, which may display different images corresponding to different visual angles based on position information with respect to the viewer's eyes.

For solving the above technical problem, in the present disclosure, it is provided a display method, including steps of:
  detecting position information with respect to viewer's eyes;
  obtaining a screen display image corresponding to a visual angle of the eyes based on the position information with respect to the eyes and parameters for a stereo image to be displayed; and
  displaying the screen display image.

Alternatively, the step of obtaining the screen display image corresponding to the visual angle of the eyes based on the position information with respect to the eyes and parameters for the stereo image to be displayed may include:
  calculating coordinates of a display position M' of each pixel M within the stereo image to be displayed on a display screen based on the position information with respect to the eyes and the parameters for the stereo image to be displayed; and
  obtaining the screen display image corresponding to the visual angle of the eyes based on the coordinates of the display position M' of each pixel M on the display screen.

Alternatively, the coordinates $(X_1, Y_1)$ of the display position M' of each pixel M within the stereo image to be displayed on the display screen may be calculated using the following equations:

$$X_1 = (L/\tan \angle A_{XZ}) - [L(L/\tan \angle A_{XZ} - b_1)/(L+a)]$$

$$Y_1 = (L/\tan \angle A_{YZ}) - [L(L/\tan \angle A_{YZ} - b_2)/(L+a)],$$

where $X_1$ represents an X-axis coordinate of M', L represents a distance between a position of the eyes and a detection point for detecting the position information with respect to the eyes in a Z-axis direction, $\angle A_{XZ}$ represents an angle of a position component of the eyes relative to the detection point in an X-axis direction, a represents a distance between the pixel M and the detection point in the Z-axis direction, $b_1$ represents a distance between the pixel M and the detection point in the X-axis direction, $Y_1$ represents a Y-axis coordinate of M', $\angle A_{YZ}$ represents an angle of the position component of the eyes relative to the detection point in a Y-axis direction, and $b_2$ represents a distance between the pixel M and the detection point in the Y-axis direction;
  wherein, in a coordinate system (X, Y, Z), the X-axis direction indicates a horizontal direction in a plane of the display screen, the Y-axis direction indicates a vertical direction in the plane of the display screen, the Z-axis direction indicates a direction perpendicular to the plane of the display screen, and the detection point indicates an origin of the coordinate system and is on the plane of the display screen; and
  wherein L, $\angle A_{XZ}$ and $\angle A_{YZ}$ are obtained based on the position information with respect to the eyes, and a, $b_1$, and $b_2$ are obtained based on the parameters for the stereo image to be displayed.

Alternatively, $\angle A_{XZ}$ and $\angle A_{YZ}$ may be calculated using the following equations:

$$\tan \angle A_{XZ} = L/x$$

$$\tan \angle A_{YZ} = L/y,$$

where (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

Alternatively, the distances between the pixel M and the detection point in the X-axis, Y-axis and Z-axis directions may be obtained by:
  obtaining distances between the pixel M and the display screen in the X-axis, Y-axis and Z-axis directions in the parameters for the stereo image to be displayed, respectively; and
  obtaining the distances between the pixel M and the detection point in the X-axis, Y-axis and Z-axis directions, respectively, based on the distances between the pixel M and the display screen in the X-axis, Y-axis and Z-axis directions, and distances between the detection point and the display screen in the X-axis, Y-axis and Z-axis directions.

Alternatively, the step of detecting the position information with respect to the viewer's eyes may include:
  obtaining images of the viewer's eyes by two cameras; and
  calculating the position information with respect to the viewer's eyes based on the images of the viewer's eyes,
  wherein a connection line between the two cameras is provided within the plane of the display screen, and the detection point is provided in the middle of the connection line.

Alternatively, the step of detecting the position information with respect to the viewer's eyes may include:

obtaining an image of the viewer's eyes by a camera; and
calculating the position information with respect to the viewer's eyes based on the image of the viewer's eyes,
wherein the camera is provided in the middle of an upper edge or a lower edge of a frame of the display screen, and the camera is provided within the plane of the display screen.

In the present disclosure, it is further provided a display device including:
a detection unit, configured to detect position information with respect to viewer's eyes;
a processing unit, configured to obtain the position information with respect to the viewer's eyes from the detection unit, and obtain a screen display image corresponding to a visual angle of the eyes based on the position information with respect to the eyes and parameters for a stereo image to be displayed; and
a display unit, configured to obtain the screen display image from the processing unit, and display the screen display image on the display unit.

Alternatively, the processing unit may be further configured to:
calculate coordinates of a display position M' of each pixel M within the stereo image to be displayed on a display screen based on the position information with respect to the eyes and the parameters for the stereo image to be displayed; and
obtain the screen display image corresponding to the visual angle of the eyes based on the coordinates of the display position M' of each pixel M on the display screen.

Alternatively, the coordinates $(X_1, Y_1)$ of the display position M' of each pixel M within the stereo image to be displayed on the display screen may be calculated by the processing unit using the following equations:

$$X_1 = (L/\tan \angle A_{XZ}) - [L(L/\tan \angle A_{XZ} - b_1)/(L+a)]$$

$$Y_1 = (L/\tan \angle A_{YZ}) - [L(L/\tan \angle A_{YZ} - b_2)/(L+a)],$$

where $X_1$ represents an X-axis coordinate of M', L represents a distance between a position of the eyes and a detection point for detecting the position information with respect to the eyes in a Z-axis direction, $\angle A_{XZ}$ represents an angle of a position component of the eyes relative to the detection point in an X-axis direction, a represents a distance between the pixel M and the detection point in the Z-axis direction, $b_1$ represents a distance between the pixel M and the detection point in the X-axis direction, $Y_1$ represents a Y-axis coordinate of M', $\angle A_{YZ}$ represents an angle of the position component of the eyes relative to the detection point in a Y-axis direction, and $b_2$ represents a distance between the pixel M and the detection point in the Y-axis direction;
wherein, in a coordinate system (X, Y, Z), the X-axis direction indicates a horizontal direction in a plane of the display screen, the Y-axis direction indicates a vertical direction in the plane of the display screen, the Z-axis direction indicates a direction perpendicular to the plane of the display screen, and the detection point indicates an origin of the coordinate system and is on the plane of the display screen; and
wherein L, $\angle A_{XZ}$ and $\angle A_{YZ}$ are obtained based on the position information with respect to the eyes, and a, $b_1$, and $b_2$ are obtained based on the parameters for the stereo image to be displayed.

Alternatively, $\angle A_{XZ}$ and $\angle A_{YZ}$ may be calculated by the processing unit using the following equations:

$$\tan \angle A_{XZ} = L/x$$

$$\tan \angle A_{YZ} = L/y,$$

where (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

Alternatively, the processing unit may be further configured to:
obtain distances between the pixel M and the display screen in the X-axis, Y-axis and Z-axis directions in the parameters for the stereo image to be displayed, respectively; and
obtain the distances between the pixel M and the detection point in the X-axis, Y-axis and Z-axis directions, respectively, based on the distances between the pixel M and the display screen in the X-axis, Y-axis and Z-axis directions, and distances between the detection point and the display screen in the X-axis, Y-axis and Z-axis directions.

Alternatively, the detection unit may include:
two cameras, configured to obtain images of the viewer's eyes; and
a calculation unit, configured to calculate the position information with respect to the viewer's eyes based on the images of the viewer's eyes,
wherein a connection line between the two cameras is provided within the plane of the display screen, and the detection point is provided in the middle of the connection line.

Alternatively, the detection unit may include:
a camera, configured to obtain an image of the viewer's eyes; and
a calculation unit, configured to calculate the position information with respect to the viewer's eyes based on the image of the viewer's eyes,
wherein the camera is provided in the middle of an upper edge or a lower edge of a frame of the display screen, and the camera is provided within the plane of the display screen.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the following, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
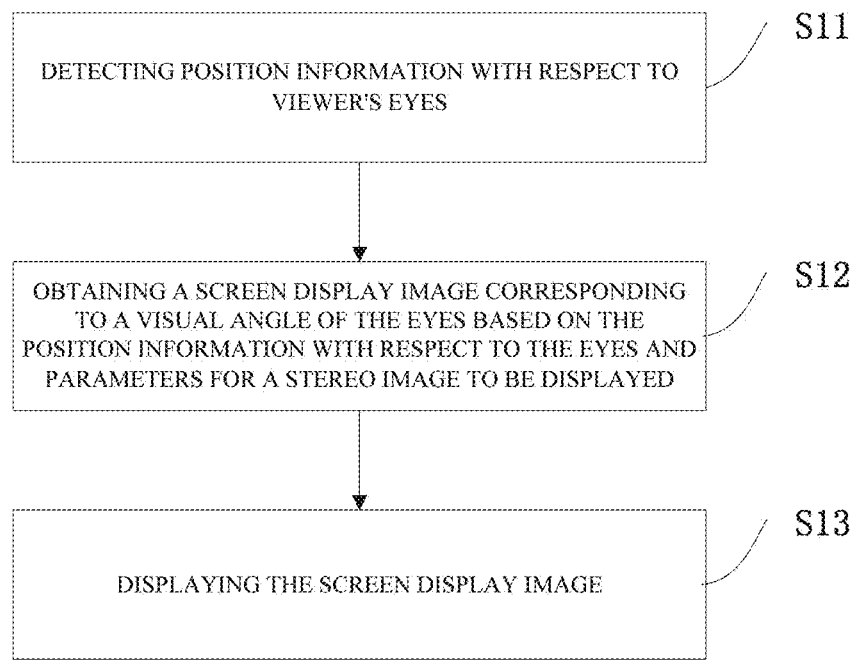
FIG. 1 illustrates a flowchart of a display method according to an embodiment of the present disclosure.

Referring to FIG. 1, it is the flowchart of the display method according to an embodiment of the present disclosure. Specifically, the method includes:

Step 11: detecting position information with respect to the viewer's eyes.

Herein, the position information with respect to the viewer's eyes may include the position coordinates of the viewer's eyes.

Step S12: obtaining a screen display image corresponding to a visual angle of the eyes based on the position information with respect to the eyes and parameters for a stereo image to be displayed.

Herein, the parameters for the stereo image to be displayed may include a position relation between each pixel M in the stereo image to be displayed and the display screen. And such position relation may be obtained based on a 3D model of the stereo image to be displayed.

Step S13: displaying the screen display image.

Figure 2:
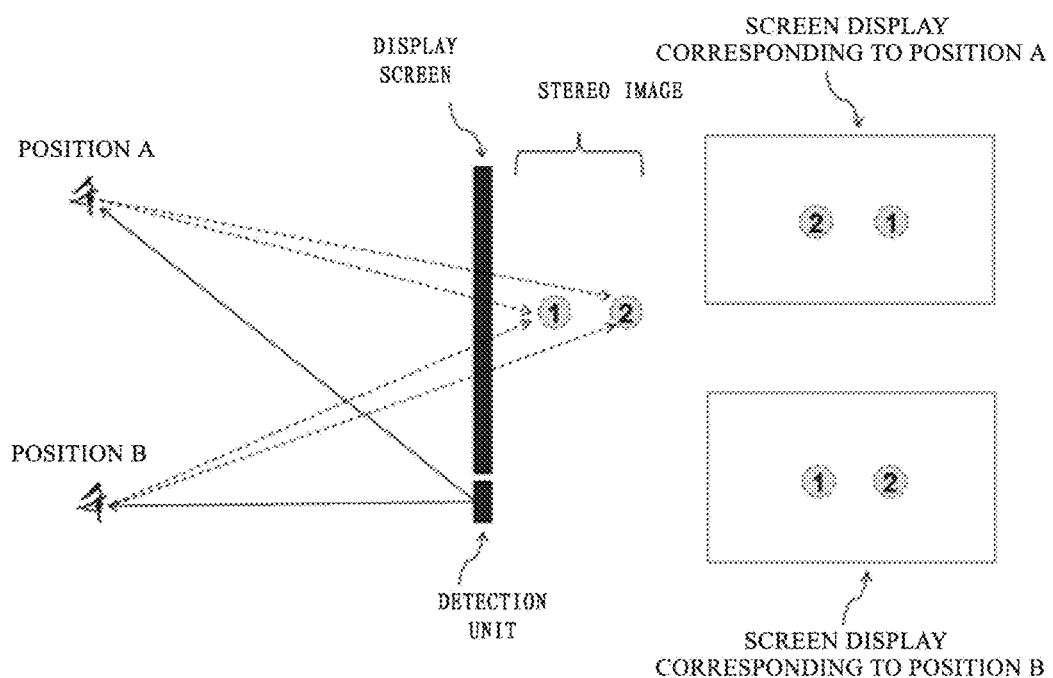
FIG. 2 illustrates an application scenario of the display method according to an embodiment of the present disclosure.

Referring to FIG. 2, it is the application scenario of the display method according to the embodiment of the present disclosure. It can be seen from FIG. 2 that a position of an object 1 and a position of an object 2 in the stereo image to be displayed on the display screen are observed by the eyes at a position A and a position B respectively, and these positions are different from one another. As illustrated in FIG. 2, a detection unit is configured for detecting the position information of the eyes.

In this embodiment, it may be displayed the screen display image corresponding to the visual angle of the viewer's eyes based on the position information with respect to the eyes instead of displaying the same screen display image irrespective of the visual angle, which may present the viewer with the visual experience as if in the real world.

In step S12, the step of obtaining a screen display image corresponding to a visual angle of the eyes based on the position information with respect to the eyes and parameters for a stereo image to be displayed may include:

Step S121: calculating coordinates of a display position M' of each pixel M within the stereo image to be displayed on the display screen based on the position information with respect to the eyes and the parameters for the stereo image to be displayed; and Step S122: obtaining the screen display image corresponding to the visual angle of the eyes based on the coordinates of the display position M' of each pixel M on the display screen.

In this embodiment, the detection unit may adopt one camera to obtain an image of the viewer's eyes, and then the position information with respect to the viewer's eyes may be calculated based on the image of the viewer's eyes obtained by the one camera. However, it is assumed that the position information with respect to the viewer's eyes calculated based on the image of the eyes obtained by the one camera is somewhat inaccurate. Thus, in this embodiment, the detection unit may adopt two cameras to obtain the image of the viewer's eyes, and then the position information of the viewer's eyes may be calculated based on the image of the eyes obtained by the two cameras, so as to achieve a more accurate result of the position information with respect to the viewer's eyes.

Alternatively, when the position information with respect to the viewer's eyes is obtained with the one camera, the one camera is provided in the middle of an upper edge or a lower edge of a frame of the display screen, and the camera is provided within the plane of the display screen.

Alternatively, when the position information with respect to the viewer's eyes is obtained with the two cameras, the two cameras are provided at two ends regarding the upper edge of the frame of the display screen respectively, or the two cameras are provided at two ends regarding the lower edge of the frame of the display screen respectively, while both of the cameras are provided within the plane of the display screen, and a connection line between the two cameras is substantially parallel to the lower edge of the frame of the display screen.

Hereafter, the embodiments are described with the examples of obtaining the position information with respect to the viewer's eyes with the two cameras.

In the following, it is described the method of calculating coordinates of a display position M' of each pixel M within the stereo image to be displayed on the display screen in details.

Before explaining the method of calculating coordinates of a display position M' of each pixel M within the stereo image to be displayed on the display screen, it is firstly introduced the coordinate system adopted by the display method of the embodiment.

In this embodiment, it is firstly established a 3D coordinate system, wherein a middle point of the connection line of the two camera may be adopted as an origin of the coordinate (hereafter, it is also called as a detection point). It is appreciated that, in other embodiments of the present disclosure, another position, for example an intersection point of diagonals on the display screen may be adopted as the origin of the coordinate.

In this 3D coordinate system, an X-axis direction indicates a horizontal direction in a plane of the display screen, a Y-axis direction indicates a vertical direction in the plane of the display screen, and a Z-axis direction indicates a direction perpendicular to the plane of the display screen.

Figure 3:
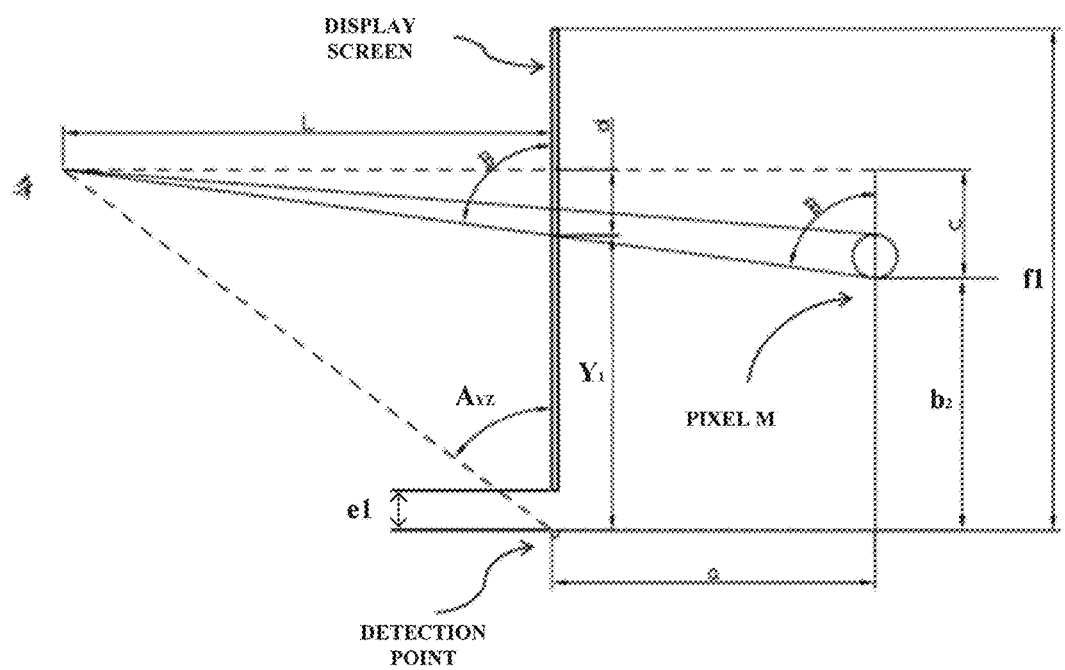
FIG. 3 illustrates a method for calculating a Y-axis coordinate of a display position M' of a pixel M on a display screen according to an embodiment of the present disclosure.

Referring to FIG. 3, it illustrates the method for calculating the Y-axis coordinate of the display position M' of the pixel M on the display screen according to the embodiment of the present disclosure. Here, FIG. 3 is a side view of the display screen.

Figure 4:
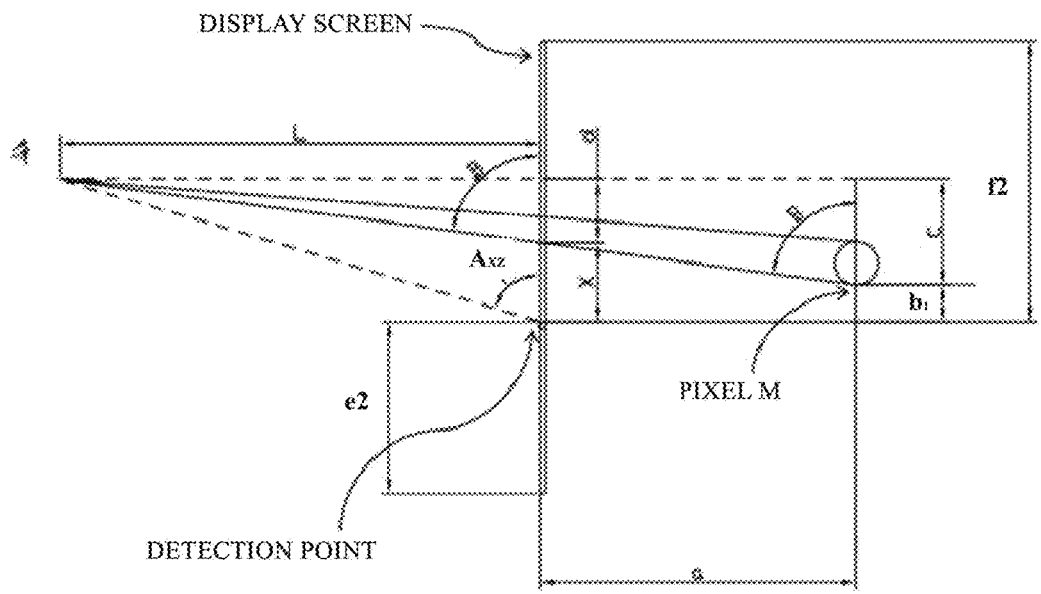
FIG. 4 illustrates a method for calculating an X-axis coordinate of a display position M' of a pixel M on a display screen according to an embodiment of the present disclosure.

As illustrated in FIG. 4, $\angle A_{YZ}$ represents an angle of position component of the eyes relative to the detection point in the Y-axis direction, and the following equation (1) may be obtained from FIG. 4:

$$\tan \angle A_{YZ} = L/(b_2+c) = L/(Y_1+d) \quad (1)$$

Herein, L represents a distance between the position of the eyes and the detection point in the Z-axis direction, $b_2$ represents a distance between the pixel M and the detection point in the Y-axis direction, c represents a distance between a line between the pixel M and the position of the eyes in the Y-axis direction and an extension line of the detection point in the Z-axis direction, and d represents a distance between an extension line of the display position M' in the Y-axis direction and an extension line of the position of the eyes vertical to the display screen.

Furthermore, the following equation (2) may be obtained from FIG. 3:

$$\tan \angle B = L/d = (L+a)/c \quad (2)$$

The following equation (3) may be obtained based on the equations (1) and (2):

$$Y_1 = (L/\tan \angle A_{YZ}) - [L(L/\tan \angle A_{YZ} - b_2)/(L+a)] \quad (3)$$

That is, the Y-axis coordinate of the display position M' of the pixel M on the display screen may be calculated using the above equation (3).

Herein, if $Y_1=e1$ or $Y_1=f1$, it is indicated that M' is on an edge of the frame of the display screen; and if $Y_1<e1$ or $Y_1>f1$, it is indicated that the M' is not on the display screen, i.e. the pixel M is not displayed on the display screen, wherein e1 represents a vertical distance between a side of the display screen being closer to the detection point and the detection point, and f1 represents a vertical distance between a side of the display screen being away from the detection point and the detection point.

Referring to FIG. 4, it illustrates the method for calculating the X-axis coordinate of the display position M' of the pixel M on the display screen according to the embodiment of the present disclosure. Here, FIG. 4 is a top view of the display screen. The method for calculating the X-axis coordinate is similar to the method for calculating the Y-axis coordinate. More particularly, the X-axis coordinate of the display position M' of each pixel M on the stereo image to be displayed on the display screen may be calculated using the following equation:

$$X_1 = (L/\tan \angle A_{XZ}) - [L(L/\tan \angle A_{XZ} - b_1)/(L+a)]$$

Herein, $X_1$ represents the X-axis coordinate of M', L represents the distance between the position of the eyes and the detection point in the Z-axis direction, $\angle A_{XZ}$ represents an angle of a position component of the eyes relative to the detection point in the X-axis direction, a represents a distance between the pixel M and the detection point in the Z-axis direction, $b_1$ represents the distance between the pixel M and the detection point in the X-axis direction, and $Y_1$ represents the Y-axis coordinate of M'.

Similarly, if $X_1=e2$ or $X_1=f2$, it is indicated that M' is on an edge of the frame of the display screen; and if $X_1>e2$ or $X_1>f2$, it is indicated that the M' is not on the display screen, i.e. the pixel M is not displayed on the display screen, wherein e2 represents a vertical distance between a first side of the display screen and the detection point, and f2 represents a vertical distance between a second side of the display screen and the detection point.

The above L, $\angle A_{XZ}$ and $\angle A_{YZ}$ are obtained based on the position information of the eyes, and a, $b_1$ and $b_2$ are obtained based on the parameters for the stereo image to be displayed.

Figure 5:
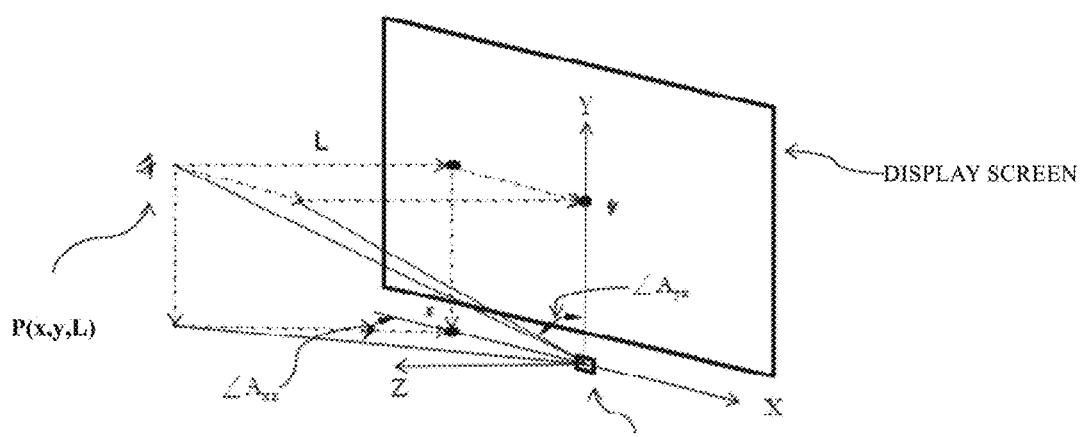
FIG. 5 illustrates a method for calculating an angle of a position component of viewer's eyes relative to the detection point in an X-axis direction and a Y-axis direction according to an embodiment of the present disclosure.

Referring to FIG. 5, it illustrates the method for calculating the angle of the position component of the eyes relative to the detection point in the X-axis direction and the Y-axis direction according to the embodiment of the present disclosure.

It can be seen from FIG. 5 that the angle $\angle A_{XZ}$ of the position component of the eyes relative to the detection point in the X-axis direction, and the angle $\angle A_{YZ}$ of the position component of the eyes relative to the detection point in the Y-axis direction may be calculated using the following equations:

$$\tan \angle A_{XZ} = L/x$$

$$\tan \angle A_{YZ} = L/y$$

Herein, P (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

In the above embodiment, the distances between the pixel M and the detection point in the X-axis, Y-axis and Z-axis directions are obtained by:
  obtaining distances between the pixel M and the display screen in the X-axis, Y-axis and Z-axis directions in the parameters for the stereo image to be displayed, respectively; and
  obtaining the distances between the pixel M and the detection point in the X-axis, Y-axis and Z-axis directions respectively, based on the distances between the pixel M and the display screen in the X-axis, Y-axis and Z-axis directions, and distances between the detection point and the display screen in the X-axis, Y-axis and Z-axis directions.

Figure 6:
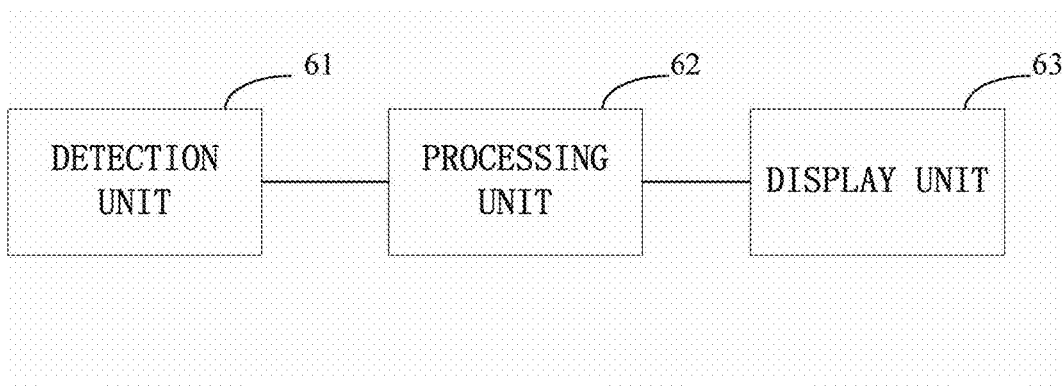
FIG. 6 illustrates a block diagram for a structure of a display device according to an embodiment of the present disclosure.

As illustrated in FIG. 6, in another embodiment of the present disclosure, it is provided a display device which is corresponding to the above display method and includes:
  a detection unit 61, configured to detect position information with respect to viewer's eyes;
  a processing unit 62, configured to obtain the position information with respect to the viewer's eyes from the detection unit 61, and obtain a screen display image corresponding to a visual angle of the eyes based on the position information with respect to the eyes and parameters for a stereo image to be displayed; and a display unit 63, configured to obtain the screen display image from the processing unit, and display the screen display image on the display unit 62.

Herein, those skilled in the art may understand that the detection unit 61 may be a camera, a webcam, a camcorder and so forth; and the display unit 63 may be a cell phone, a computer, a television, a digital camera and so forth. However, the present disclosure is not limited thereto.

Furthermore, those skilled in the art may further understand that the processing unit 62 may be implemented as a hardware, a firmware, a software or a combination thereof in any computing device (including a processor, a storage medium, and etc.) or a network of the computing devices, which may be implemented by those skilled in the art with basic programming skills under the teaching of the present disclosure.

In this embodiment of the present disclosure, it is displayed the screen display image corresponding to the visual angle of the viewer's eyes based on the position information with respect to the eyes instead of displaying the same screen display image irrespective of the visual angle, which may present the viewer with the visual experience as if in the real world.

Alternatively, the processing unit 62 is further configured to:

calculate coordinates of a display position M' of each pixel M within the stereo image to be displayed on a display screen based on the position information with respect to the eyes and the parameters for the stereo image to be displayed; and obtain the screen display image corresponding to the visual angle of the eyes based on the coordinates of the display position M' of each pixel M on the display screen.

Alternatively, the coordinates $(X_1, Y_1)$ of the display position M' of each pixel M within the stereo image to be displayed on the display screen are calculated by the processing unit 62 using the following equations:

$$X_1 = (L/\tan \angle A_{XZ}) - [L(L/\tan \angle A_{XZ} - b_1)/(L+a)]$$

$$Y_1 = (L/\tan \angle A_{YZ}) - [L(L/\tan \angle A_{YZ} - b_2)/(L+a)],$$

where $X_1$ represents an X-axis coordinate of M', L represents a distance between a position of the eyes and a detection point in a Z-axis direction, $\angle A_{XZ}$ represents an angle of a position component of the eyes relative to the detection point in an X-axis direction, a represents a distance between the pixel M and the detection point in the Z-axis direction, $b_1$ represents a distance between the pixel M and the detection point in the X-axis direction, $Y_1$ represents a Y-axis coordinate of M', $\angle A_{YZ}$ represents an angle of the position component of the eyes relative to the detection point in a Y-axis direction, and $b_2$ represents a distance between the pixel M and the detection point in the Y-axis direction.

In a coordinate system (X, Y, Z), the X-axis direction indicates a horizontal direction in a plane of the display screen, the Y-axis direction indicates a vertical direction in the plane of the display screen, the Z-axis direction indicates a direction perpendicular to the plane of the display screen, and the detection point indicates an origin of the coordinate system and is on the plane of the display screen; and L, $\angle A_{XZ}$ and $\angle A_{YZ}$ are obtained based on the position information with respect to the eyes, and a, $b_1$, and $b_2$ are obtained based on the parameters for the stereo image to be displayed.

Alternatively, $\angle A_{XZ}$ and $\angle A_{YZ}$ are calculated by the processing unit 62 using the following equations:

$$\tan \angle A_{XZ} = L/x$$

$$\tan \angle A_{YZ} = L/y,$$

where (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

Alternatively, the processing unit 62 is further configured to:

obtain distances between the pixel M and the display screen in the X-axis, Y-axis and Z-axis directions in the parameters for the stereo image to be displayed respectively; and obtain the distances between the pixel M and the detection point in the X-axis, Y-axis and Z-axis directions respectively, based on the distances between the pixel M and the display screen in the X-axis, Y-axis and Z-axis directions, and distances between the detection point and the display screen in the X-axis, Y-axis and Z-axis directions.

Alternatively, the detection unit 61 includes:

two cameras, configured to obtain images of the viewer's eyes; and a calculation unit, configured to calculate the position information with respect to the viewer's eyes based on the images of the viewer's eyes, wherein a connection line between the two cameras is provided within the plane of the display screen, and the detection point is provided in the middle of the connection line.

Alternatively, the detection unit 61 includes:

a camera, configured to obtain an image of the viewer's eyes; and a calculation unit, configured to calculate the position information with respect to the viewer's eyes based on the image of the viewer's eyes, wherein the camera is provided in the middle of an upper edge or a lower edge of a frame of the display screen, and the camera is provided within the plane of the display screen.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A display device, comprising:
a detection unit, configured to detect position information with respect to viewer's eyes;
a processing unit, configured to obtain the position information with respect to the viewer's eyes from the detection unit, and obtain a screen display image corresponding to a visual angle of the eyes based on the position information with respect to the eyes and parameters for a stereo image to be displayed; and a display unit, configured to obtain the screen display image from the processing unit, and display the screen display image on the display unit, wherein the processing unit is further configured to:

calculate coordinates of a display position M' of each pixel M within the stereo image to be displayed on a display screen based on the position information with respect to the eyes and the parameters for the stereo image to be displayed; and obtain the screen display image corresponding to the visual angle of the eyes based on the coordinates of the display position M' of each pixel M on the display screen, wherein the coordinates $(X_1,Y_1)$ of the display position M' of each pixel M within the stereo image to be displayed on the display screen are calculated by the processing unit using the following equations:

$$X_1=(L/\tan \angle A_{XZ})-[L(L/\tan \angle A_{XZ}-b_1)/(L+a)]$$

$$Y_1=(L/\tan \angle A_{YZ})-[L(L/\tan \angle A_{YZ}-b_2)/(L+a)],$$

where $X_1$ represents an X-axis coordinate of M', L represents a distance between a position of the eyes and a detection point for detecting the position information with respect to the eyes in a Z-axis direction, $\angle A_{XZ}$ represents an anile of a position component of the eyes relative to the detection point in an X-axis direction, a represents a distance between the pixel M and the detection point in the Z-axis direction, $b_1$ represents a distance between the pixel M and the detection point in the X-axis direction, $Y_1$ represents a Y-axis coordinate of M', $\angle A_{YZ}$ represents an angle of the position component of the eyes relative to the detection point in a Y-axis direction, and $b_2$ represents a distance between the pixel M and the detection point in the Y-axis direction;

wherein, in a coordinate system (X, Y, Z), the X-axis direction indicates a horizontal direction in a plane of the display screen, the Y-axis direction indicates a vertical direction in the plane of the display screen, the Z-axis direction indicates a direction perpendicular to the plane of the display screen, and the detection point indicates an origin of the coordinate system and is on the plane of the display screen, and wherein L, $\angle A_{XZ}$ and $\angle A_{YZ}$ are obtained based on the position information with respect to the eyes, and a, $b_1$, and $b_2$ are obtained based on the parameters for the stereo image to be displayed.

2. The display device according to claim 1, wherein $\angle A_{XZ}$ and $\angle A_{YZ}$ are calculated by the processing unit using the following equations:

$$\tan \angle A_{XZ}=L/x$$

$$\tan \angle A_{YZ}=L/y,$$

where (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

3. The display device according to claim 1, wherein the processing unit is further configured to:

obtain distances between the pixel M and the display screen in the X-axis, Y-axis and Z-axis directions in the parameters for the stereo image to be displayed, respectively; and obtain the distances between the pixel M and the detection point in the X-axis, Y-axis and Z-axis directions, respectively, based on the distances between the pixel M and the display screen in the X-axis, Y-axis and Z-axis directions, and distances between the detection point and the display screen in the X-axis, Y-axis and Z-axis directions.

4. The display device according to claim 1, wherein the detection unit comprises:

two cameras, configured to obtain images of the viewer's eyes; and a calculation unit, configured to calculate the position information with respect to the viewer's eyes based on the images of the viewer's eyes, wherein a connection line between the two cameras is provided within the plane of the display screen, and the detection point is provided in the middle of the connection line.

5. The display device according to claim 4, wherein the detection unit comprises:

two cameras, configured to obtain images of the viewer's eyes; and a calculation unit, configured to calculate the position information with respect to the viewer's eyes based on the images of the viewer's eyes, wherein a connection line between the two cameras is provided within the plane of the display screen, and the detection point is provided in the middle of the connection line.

6. The display device according to claim 3, wherein the detection unit comprises:

two cameras, configured to obtain images of the viewer's eyes; and a calculation unit, configured to calculate the position information with respect to the viewer's eyes based on the images of the viewer's eyes, wherein a connection line between the two cameras is provided within the plane of the display screen, and the detection point is provided in the middle of the connection line.

7. The display device according to claim 1, wherein the detection unit comprises:

a camera, configured to obtain an image of the viewer's eyes; and a calculation unit, configured to calculate the position information with respect to the viewer's eyes based on the image of the viewer's eyes, wherein the camera is provided in the middle of an upper edge or a lower edge of a frame of the display screen, and the camera is provided within the plane of the display screen.

8. The display device according to claim 4, wherein the detection unit comprises:

a camera, configured to obtain an image of the viewer's eyes; and a calculation unit, configured to calculate the position information with respect to the viewer's eyes based on the image of the viewer's eyes, wherein the camera is provided in the middle of an upper edge or a lower edge of a frame of the display screen, and the camera is provided within the plane of the display screen.

9. A displaying method, comprising steps of:
detecting position information with respect to viewer's eyes;
obtaining a screen display image corresponding to a visual angle of the eyes based on the position information with respect to the eyes and parameters for a stereo image to be displayed; and
displaying the screen display image,
wherein the step of obtaining the screen display image corresponding to the visual angle of the eyes based on the position information with respect to the eyes and parameters for the stereo image to be displayed comprises:
calculating coordinates of a display position M' of each pixel M within the stereo image to be displayed on a display screen based on the position information with respect to the eyes and the parameters for the stereo image to be displayed; and
obtaining the screen display image corresponding to the visual angle of the eyes based on the coordinates of the display position M' of each pixel M on the display screen,
wherein the coordinates $(X_1, Y_1)$ of the display position M' of each pixel M within the stereo image to be displayed on the display screen are calculated using the following equations:

$$X_1 = (L/\tan \angle A_{XZ}) - [L(L/\tan \angle A_{XZ} - b_1)/(L+a)]$$

$$Y_1 = (L/\tan \angle A_{YZ}) - [L(L/\tan \angle A_{YZ} - b_2)/(L+a)],$$

where $X_1$ represents an X-axis coordinate of M', L represents a distance between a position of the eyes and a detection point for detecting the position information with respect to the eyes in a Z-axis direction, $\angle A_{XZ}$ represents an angle of a position component of the eyes relative to the detection point in an X-axis direction, a represents a distance between the pixel M and the detection point in the Z-axis direction, $b_1$ represents a distance between the pixel M and the detection point in the X-axis direction, $Y_1$ represents a Y-axis coordinate of M', $\angle A_{YZ}$ represents an angle of the position component of the eyes relative to the detection point in a Y-axis direction, and $b_2$ represents a distance between the pixel M and the detection point in the Y-axis direction;
wherein, in a coordinate system (X, Y, Z), the X-axis direction indicates a horizontal direction in a plane of the display screen, the Y-axis direction indicates a vertical direction in the plane of the display screen, the Z-axis direction indicates a direction perpendicular to the plane of the display screen, and the detection point indicates an origin of the coordinate system and is on the plane of the display screen; and
wherein L, $\angle A_{XZ}$, and $\angle A_{YZ}$ are obtained based on the position information with respect to the eyes, and a, $b_1$, and $b_2$ are obtained based on the parameters for the stereo image to be displayed.

10. The display method according to claim 9, wherein $\angle A_{XZ}$ and $\angle A_{YZ}$ are calculated using the following equations:

$$\tan \angle A_{XZ} = L/x$$

$$\tan \angle A_{YZ} = L/y,$$

where (x, y, L) represents position coordinates of the eyes in the position information with respect to the eyes, x represents a distance between the position of the eyes and the detection point in the X-axis direction, y represents a distance between the position of the eyes and the detection point in the Y-axis direction, and L represents a distance between the position of the eyes and the detection point in the Z-axis direction.

11. The display method according to claim 9, wherein the distances between the pixel M and the detection point in the X-axis, Y-axis and Z-axis directions are obtained by:
obtaining distances between the pixel M and the display screen in the X-axis, Y-axis and Z-axis directions in the parameters for the stereo image to be displayed, respectively; and
obtaining the distances between the pixel M and the detection point in the X-axis, Y-axis and Z-axis directions, respectively, based on the distances between the pixel M and the display screen in the X-axis, Y-axis and Z-axis directions, and distances between the detection point and the display screen in the X-axis, Y-axis and Z-axis directions.

12. The display method according to claim 9, wherein the step of detecting the position information with respect to the viewer's eyes comprises:
obtaining images of the viewer's eyes by two cameras; and
calculating the position information with respect to the viewer's eyes based on the images of the viewer's eyes,
wherein a connection line between the two cameras is provided within the plane of the display screen, and the detection point is provided in the middle of the connection line.

13. The display method according to claim 10, wherein the step of detecting the position information with respect to the viewer's eyes comprises:
obtaining images of the viewer's eyes by two cameras; and
calculating the position information with respect to the viewer's eyes based on the images of the viewer's eyes,
wherein a connection line between the two cameras is provided within the plane of the display screen, and the detection point is provided in the middle of the connection line.

14. The display method according to claim 11, wherein the step of detecting the position information with respect to the viewer's eyes comprises:
obtaining images of the viewer's eyes by two cameras; and
calculating the position information with respect to the viewer's eyes based on the images of the viewer's eyes,
wherein a connection line between the two cameras is provided within the plane of the display screen, and the detection point is provided in the middle of the connection line.

15. The display method according to claim 9, wherein the step of detecting the position information with respect to the viewer's eyes comprises:
obtaining an image of the viewer's eyes by a camera; and
calculating the position information with respect to the viewer's eyes based on the image of the viewer's eyes,
wherein the camera is provided in the middle of an upper edge or a lower edge of a frame of the display screen, and the camera is provided within the plane of the display screen.

16. The display method according to claim 10, wherein the step of detecting the position information with respect to the viewer's eyes comprises:

obtaining an image of the viewer's eyes by a camera; and
calculating the position information with respect to the viewer's eyes based on the image of the viewer's eyes,
wherein the camera is provided in the middle of an upper edge or a lower edge of a frame of the display screen, and the camera is provided within the plane of the display screen.

\* \* \* \* \*